(12) United States Patent
Guo et al.

(10) Patent No.: US 12,103,177 B2
(45) Date of Patent: Oct. 1, 2024

(54) DECOUPLING CONTROL METHOD FOR HUMANOID ROBOT, HUMANOID ROBOT AND COMPUTER-READABLE STORAGE MEDIUM

(71) Applicant: UBTECH ROBOTICS CORP LTD, Shenzhen (CN)

(72) Inventors: Yijie Guo, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 231 days.

(21) Appl. No.: 17/868,790

(22) Filed: Jul. 20, 2022

(65) Prior Publication Data

US 2022/0362929 A1    Nov. 17, 2022

Related U.S. Application Data

(63) Continuation of application No. PCT/CN2021/132996, filed on Nov. 25, 2021.

(30) Foreign Application Priority Data

Feb. 24, 2021    (CN) .......................... 202110209690.1

(51) Int. Cl.
  *B25J 9/00*    (2006.01)
  *B25J 9/16*    (2006.01)

(52) U.S. Cl.
  CPC ............ *B25J 9/1607* (2013.01); *B25J 9/1615* (2013.01); *B25J 9/163* (2013.01); *B25J 9/1638* (2013.01); *B25J 9/1653* (2013.01)

(58) Field of Classification Search
  CPC ........ B25J 9/1607; B25J 9/1615; B25J 9/163; B25J 9/1638; B25J 9/1653; B25J 9/1602;
  (Continued)

(56) References Cited

U.S. PATENT DOCUMENTS 8,924,010 B2 * 12/2014 Riener ................. G05B 19/423
                                                              700/245
9,975,249 B2 *  5/2018 Herr ....................... B25J 9/1694
(Continued)

FOREIGN PATENT DOCUMENTS

CN            110104216 A      8/2019

*Primary Examiner* — Ian Jen

(57) ABSTRACT

A decoupling control method for a humanoid robot includes: decomposing tasks of the humanoid robot to obtain kinematic tasks and dynamic tasks, and classifying corresponding joints of the humanoid robot into kinematic task joints or dynamic task joints; solving desired positions and desired speeds of the kinematic task joints for performing the kinematic tasks according to desired positions and desired speeds of ends in the kinematic tasks using inverse kinematics; calculating torques of the kinematic task joints based on the desired positions and desired speeds of the kinematic task joints; and solving a pre-built optimization model of torques required for the dynamic task joints based on the calculated torques of the kinematic task joints, to obtain torques required by the dynamic task joints for performing the dynamic tasks.

20 Claims, 6 Drawing Sheets

(58) Field of Classification Search
CPC ...... B25J 9/1661; B25J 9/1664; B25J 9/1679; B25J 17/02; B62D 57/032; G05B 2219/40264
See application file for complete search history.

(56) References Cited

U.S. PATENT DOCUMENTS

| | | | |
|---|---|---|---|
| 10,406,059 B2* | 9/2019 | Agrawal | A61H 1/0262 |
| 11,278,433 B2* | 3/2022 | Herr | B25J 19/0008 |
| 11,625,881 B2* | 4/2023 | Villegas | G06T 15/40 345/473 |
| 2014/0088729 A1* | 3/2014 | Herr | A61F 2/68 623/50 |
| 2016/0207201 A1* | 7/2016 | Herr | B25J 9/1694 |

* cited by examiner

DECOUPLING CONTROL METHOD FOR HUMANOID ROBOT, HUMANOID ROBOT AND COMPUTER-READABLE STORAGE MEDIUM

CROSS REFERENCE TO RELATED APPLICATIONS

The present application is a continuation-application of international Application PCT/CN2021/132996, with an international filing date of Nov. 25, 2021, which claims foreign priority of Chinese Patent Application No. 202110209690.1, filed on Feb. 24, 2021 in the China National Intellectual Property Administration of China, the contents of all of which are hereby incorporated by reference.

BACKGROUND

1. Technical Field

The present disclosure generally relates to robots, and particularly to a decoupling control method, a humanoid robot, and a computer-readable storage medium.

2. Description of Related Art

A humanoid robot is a complex system with multiple degrees of freedom. In the control of humanoid robots, the control objectives are various, and the control methods are different for different task requirements. For example, when the robot of FIG. 1 walks, the requirement for accuracy of the positions of its arms is relatively high, the robot can thus be controlled based on kinematics. Additionally, since the feet of a humanoid robot needs to be in contact with a support surface (e.g., ground, floor, etc.), when the robot walks, the force between the sole and the support surface needs to meet the constraints of the friction cone to ensure that the support feet will not move. As a result, requirements for force control are relatively high, and dynamic control can be used for control of the robot. Although these two control methods can be used for humanoid robots, current control frameworks often only use one of the two control methods to control the whole body of the robot, or simply use both control methods without considering the compatibility of the two control methods, which may result in the conflict of the two methods and adversely affect the control effect.

Therefore, there is a need to provide a method to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
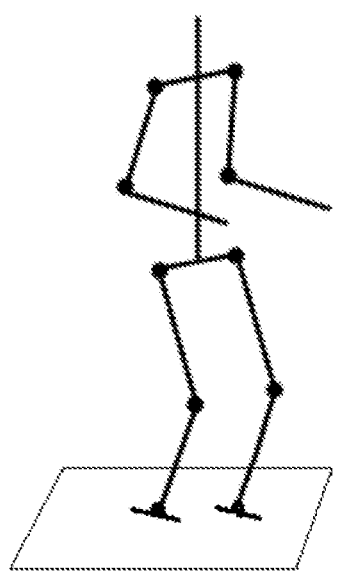
FIG. 1 is a schematic diagram of a humanoid robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
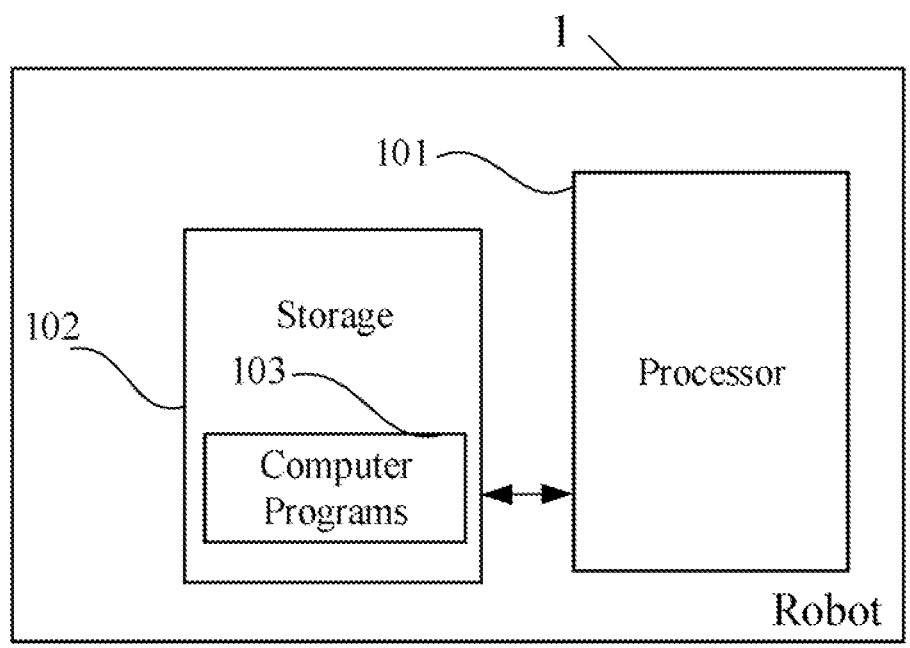
FIG. 2 is a schematic block diagram of the humanoid robot according to one embodiment.
Figure 3:
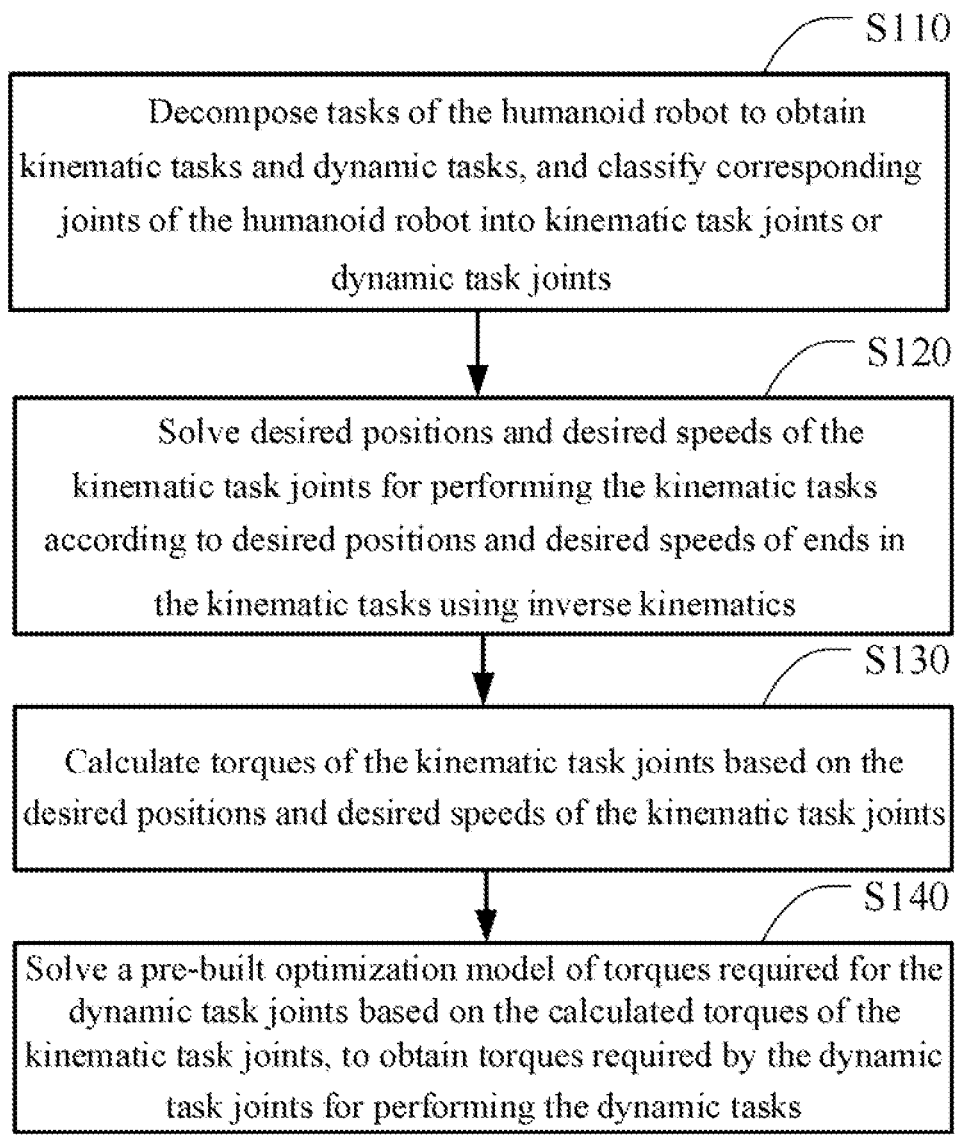
FIGS. 3-5 are exemplary flowcharts of a decoupling control method for a humanoid robot according to one embodiment.

FIG. 2 shows a schematic block diagram of a humanoid robot according to one embodiment. The robot may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the robot, such as steps S110 to S140 in FIG. 3 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 6:
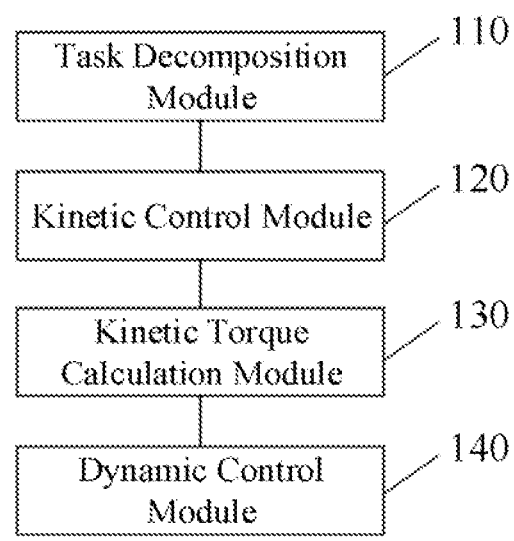
FIG. 6 is a schematic block diagram of a decoupling control method for a humanoid robot according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 112 may be divided into a task decomposition module kinetic control module 120, a kinetic torque calculation module 130, and a dynamic control module 140 as shown in FIG. 6.

FIG. 3 shows an exemplary decoupling control method for a humanoid robot, which can be used for full-body task control of the humanoid robot, including simultaneously realizing kinematic task control and dynamic task control. In one embodiment, the method may include steps S110 to S140.

Step S110: Decompose tasks of the humanoid robot to obtain kinematic tasks and dynamic tasks, and classify corresponding joints of the humanoid robot into kinematic task joints or dynamic task joints.

Exemplarily, the whole-body tasks of the humanoid robot can be decomposed into kinematic tasks and dynamic tasks according to different task requirements. A kinematic control approach may be adopted for the kinematic tasks. The approach calculates the positions and speeds of the corresponding joints using inverse kinematics according to the given end desired trajectory, and then performs position tracking through joint control. A dynamic control approach may be adopted for the dynamic tasks. The approach mainly calculates the forces received by the ends and the torques of the corresponding joints using inverse dynamics according to the given desired acceleration of the ends, and then sends the joint torque commands for corresponding control.

In the embodiment, after the tasks are decomposed, type classifying is performed for the corresponding joints of the humanoid robot. In one embodiment, the joints used to perform kinematic tasks are referred to as kinematic task joints, and the joints used to perform dynamic tasks are referred to as dynamic joints.

Taking control of the swing arms of the humanoid robot of FIG. 1 as an example, since the arms are not in contact with the external environment, it can be controlled based on kinematics. That is, control of the swing arms of the humanoid robot can be classified as a kinematic task. Taking the gait control of a humanoid robot as an example, due to the contact between the soles of the feet and the support surface, the corresponding constraints of the friction force of the soles of the feet need to be met, it needs to be controlled based on dynamics. That is, the gait control of the humanoid robot can be classified as a dynamic task. In this case, the joints of the legs of the humanoid robot are dynamic task joints.

Generally, the dynamic equation of a robot can be: $M\ddot{q}+h=B\tau+J^T F_f$, where M represents an inertia matrix, h includes gravity, Coriolis force and centrifugal force, $\ddot{q}$ represents the acceleration of all of joints of the humanoid robot, B represents a torque selection matrix, $\tau$ represents the torques of all of joints of the humanoid robot, J represents a Jacobian matrix of all the ends (that is, the above-mentioned contact points) of the robot that make contact with the environment, and $F_f$ represents the external force (that is, the above-mentioned contact force) on all contact points.

The positions of the ends of the robot in contact with the environment has zero acceleration relative to the environment, that is, a position constraint can be expressed as follows: $J\ddot{q}+\dot{J}\dot{q}=0$, where $\dot{J}$ represents a derivative of the Jacobian matrix J, and $\dot{q}$ and $\ddot{q}$ represent speeds and acceleration of all of joints of the humanoid robot. By substituting this position constraint into the above dynamic equation, the following equation can be got: $F_j=(JM^{-1}J^T)^{-1}(JM^{-1}h-\dot{J}\dot{q}-JM^{-1}\tau)$. According to the equation, the contact force $F_f$ is determined by the joint torques at the corresponding moment. Therefore, the dynamic equation of the robot can also be expressed as: $M\ddot{q}+N_s^T h+\gamma=N_s^T B\tau$, where $N_s=I-J^T(JM^{-1}J^T)^{-1}JM^{-1}$, $\gamma=-J^T(JM^{-1}J^T)\dot{J}\dot{q}$. For subsequent convenience, intermediate variables and descriptions are adopted, which have no substantial meaning.

In one embodiment, when described by the torques of the decomposed kinematic task joints and the torques of the dynamic task joints, the dynamic equation of the humanoid robot after the task decomposition can be expressed as: $M\ddot{q}+N_s^T h+\gamma=N_s^T B^{kine}\tau^{kine}+N_s^T B^{dyna}\tau^{dyna}$, where $B^{kine}$ and $B^{dyna}$ represent torque selection matrices of the kinematic task joints and the kinematic task joints, $\tau^{kine}$ and represent the torques of the kinematic task joints and the torques of the dynamic task joints.

Step S120: Solve desired positions and desired speeds of the kinematic task joints for performing the kinematic tasks according to desired positions and desired speeds of ends in the kinematic tasks using inverse kinematics.

For the decomposed kinematic tasks, according to the desired positions or trajectory and desired speeds of the pre-planned control targets (i.e., the ends) in the task space, the desired positions and desired speeds of the joints in the joint space can be solved using inverse kinematics. The corresponding joint desired position and desired speed commands can then be sent to the kinematic task joints to perform the kinematic tasks.

Taking the foregoing kinematic task of swing arm control as an example. According to the pre-planned desired position and speed of the ends of the arms at the corresponding moment, the desired position and speed of each joint of the arms in the joint space at the corresponding moment can be obtained through inverse kinematics calculation. Then, the desired positions and speeds of the joints at the corresponding moment are sent, as an instruction, to the joint motors of the position control type (referred to as position control type), so that the corresponding joints execute the desired arm swinging action.

In the embodiment, decoupling control is performed by decomposing the kinematic tasks and the dynamic tasks of the humanoid robot. It can be understood that the step S120 is the step of realizing kinematic task control. For the dynamic tasks, in this embodiment, a quadratic optimization problem is constructed. That is, the actual acceleration of the control targets (i.e., the ends) of the dynamic tasks is made to be as close as possible to the planned desired acceleration, and the torques of the kinematic task joints and the torques of the dynamic task joints satisfying the system dynamic equation of the robot is used as the constraint condition of the optimization model, so as to obtain the torques required by the dynamic task joints.

Step S130: Calculate torques of the kinematic task joints based on the desired positions and desired speeds of the kinematic task joints.

Figure 4:
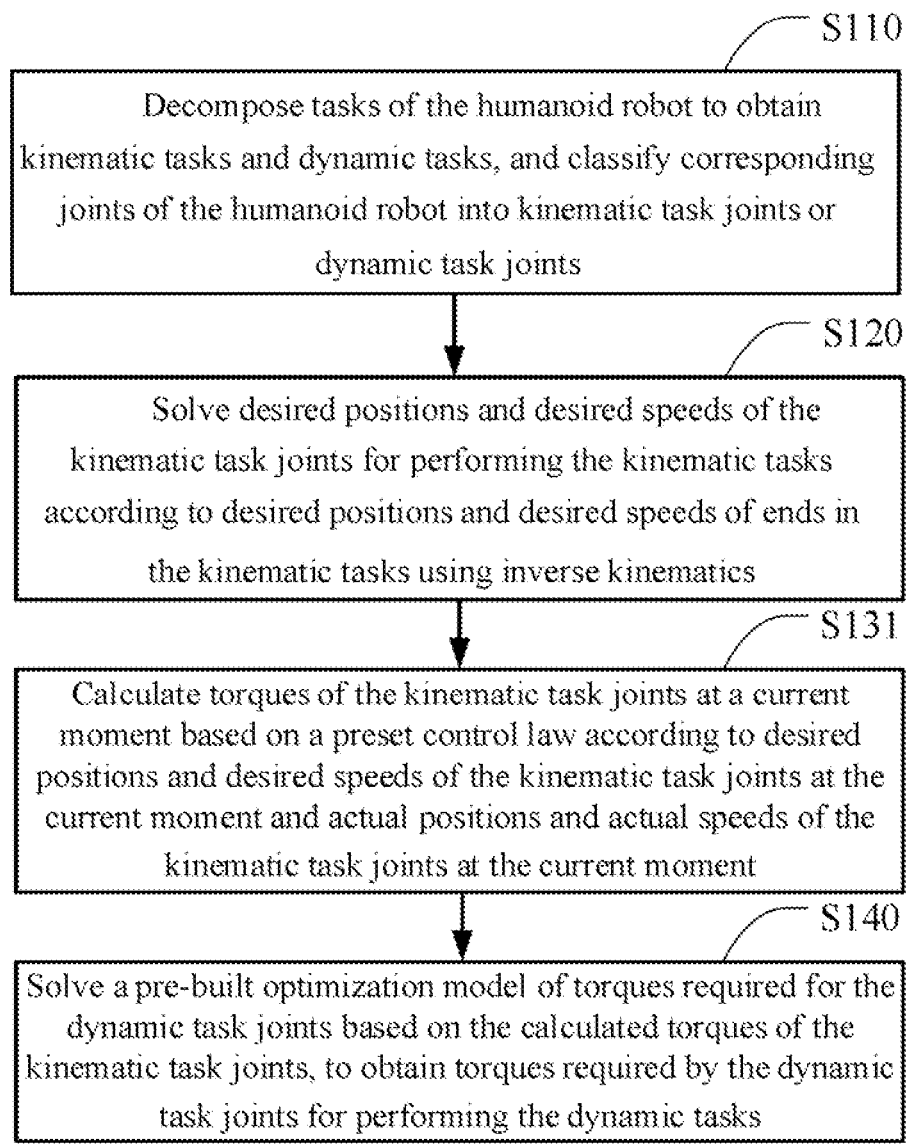

Considering that all the joints of the humanoid robot should satisfy the system dynamic equation, it needs to calculate the torques executed by the kinematic task joints, so as to further solve the torques of the dynamic joints. In one embodiment, as shown in FIG. 4, step S130 may include a step S131.

Step S131: Calculate torques of the kinematic task joints at a current moment based on a preset control law according to desired positions and desired speeds of the kinematic task joints at the current moment and actual positions and actual speeds of the kinematic task joints at the current moment.

After the kinematic task joints receive the desired joint position command and desired joint speed command, it will calculate and execute the joint torques according to the corresponding joint control law and the actual positions and speeds of the joints. For example, the preset joint control law can be expressed as follows: $\tau_{cmd}^{kine}=K_p(q_d^{kine}-q^{kine})+K_d(\dot{q}_d^{kine}-\dot{q}^{kine})$, where $\tau_{cmd}^{kine}$ represents the torques of the kinematic task joints, $q_d^{kine}$ and $q^{kine}$ represent the desired positions and actual positions of the kinematic task joints, $K_p$ and $K_d$ represent a preset proportional adjustment coefficient and a preset differential adjustment coefficient in the control law. It should be noted that the calculated torques of the kinematic task joints at the corresponding moment be used to solve the optimization model of the torques required by the kinematic task joints.

In addition, since the motors of the position-controlled joints receive the desired position command and desired speed command and perform position following, considering that there are often disturbances such as friction in the joints, the joint torques actually executed are not equal to the torques calculated using the control law. For the position-controlled joints, a large deceleration will result in a large friction force. Thus, this disturbance is more obvious in the position-controlled joints. Therefore, in one embodiment, the torque errors caused by friction and other disturbances can be estimated so as to correct the directly calculated torques, and the corrected torques can then be used to solve an optimization model of the torques required by the dynamic task joints.

Figure 5:
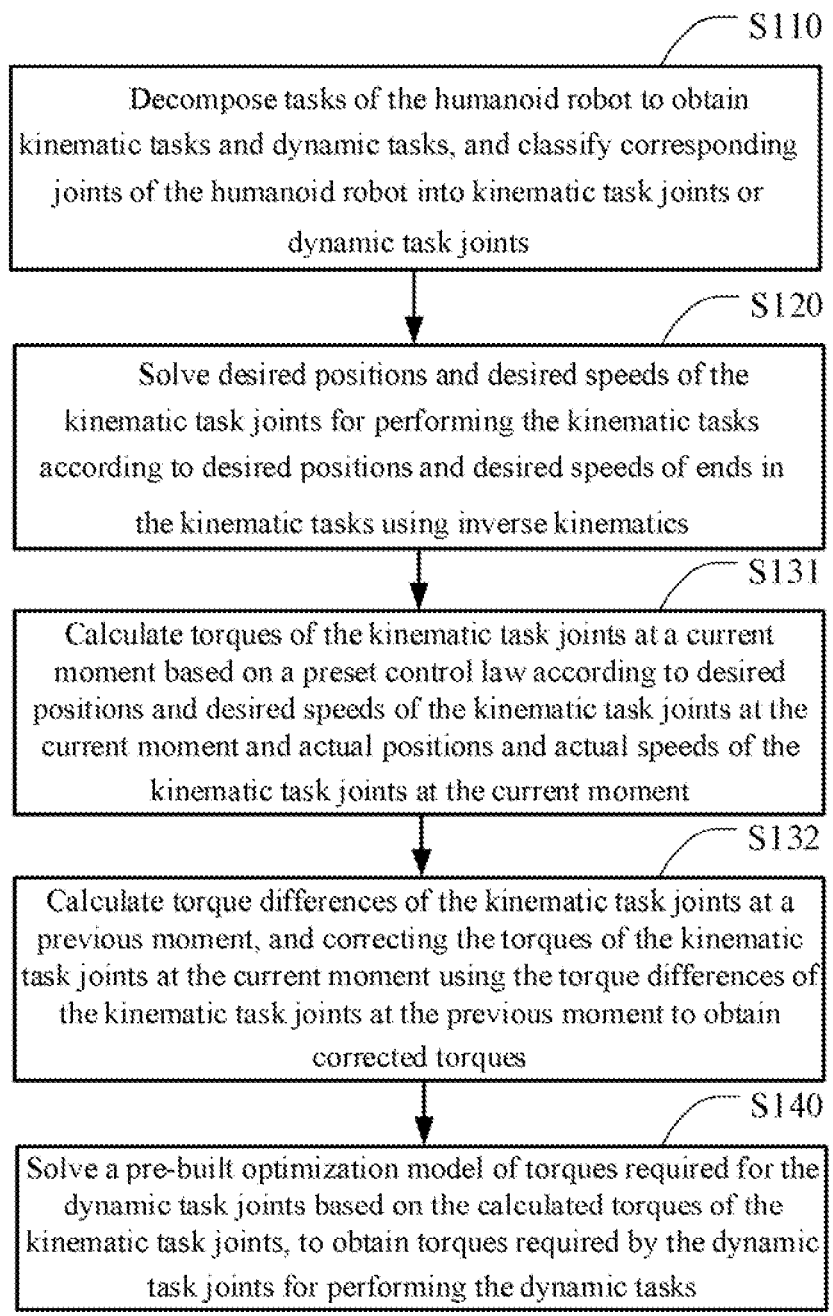

In another embodiment as shown in FIG. 5, step S130 may include a step S132.

Step S132: Calculate torque differences of the kinematic task joints at a previous moment, and correcting the torques of the kinematic task joints at the current moment using the torque differences of the kinematic task joints at the previous moment to obtain corrected torques, wherein the corrected torques are configured for solving the optimization model.

The calculation step of the torque differences at the previous moment may be performed after the above-mentioned step S131, or may be performed simultaneously. In on embodiment, the calculation step of the torque differences at the previous moment may include: reading torques of the kinematic task joints at the previous moment that are calculated using the preset control law; calculating back actual torques of the kinematic task joints at the previous moment using a dynamic equation after task decomposition based on actual acceleration of the kinematic task joints at the previous moment; and obtaining the torque differences of the kinematic task joints at the previous moment by performing subtraction between the calculated torques of the kinematic task joints at the previous moment and the actual torques of the kinematic task joints at the previous moment.

For example, the state of each joint of the humanoid robot at the previous moment, including the actual acceleration of the joints, and the historical data such as the actual torques of the dynamic task joints, is substituted into the dynamic equation after the forgoing task decomposition, which can calculate back the actual torques $\tau^{kine}(t_{pre})$ of the kinematic task joints at the previous moment. The torques at the previous moment solved by the kinematic task joints using the preset control law is represented by $\tau_{cmd}^{kine}(t_{pre})$. The torque differences $\delta(t_{pre})$ can be calculated by performing subtraction between the cirques above. That is, $\delta(t_{pre})=\tau^{kine}(t_{pre})-\tau_{cmd}^{kine}(\tau_{pre})$.

The corrected torques $\bar{\tau}_{cmd}^{kine}(t)$ at the current moment can be calculated b adding the torques $\tau_{cmd}^{kine}(t)$ of the kinematic torques at the current moment and the torque differences $\delta(t_{pre})$ at the previous moment together. That is, $\bar{\tau}_{cmd}^{kine}(t)=\tau_{cmd}^{kine}(t)+\delta(t_{pre})$.

The embodiment above features that the optimization model is solved by using the corrected torques of the kinematic task joints. By considering the friction and other disturbances in the kinematic task joints, the task decoupling control can be realized, and the torques required by the dynamic task joints can be calculated more accurately, thereby improving the control accuracy of the dynamic tasks.

In one embodiment, after the kinematic tasks and the dynamic tasks are decomposed in the foregoing step S110, a quadratic optimization problem (also called an optimization model) of the torques required by the dynamic task joints can be constructed. For example, the actual acceleration of the control targets in the dynamic tasks is made to be as close as possible to the planned desired acceleration.

The mapping relationship between the acceleration of the ends and the acceleration of the joints in the dynamic tasks is as follows: $\ddot{x}^{dyno}=J^{dyna}\ddot{q}+\dot{J}^{dyna}\dot{q}$, where $\ddot{x}^{dyna}$ represents the acceleration of the ends in the dynamic tasks, $J^{dyna}$ represents a Jacobian matrix for control ends in the dynamic tasks, $\dot{J}^{dyna}$ represents a derivative of the Jacobian matrix $J^{dyna}$, $\dot{q}$ and $\ddot{q}$ represent speeds and acceleration of all of joints of the humanoid robot, which are obtained by first-order derivation and second-order derivation of the positions q of all joints. For a humanoid robot, the foregoing positions q include the positions $q^{kine}$ of the kinematic task joints and the positions $q^{dyna}$ of the dynamic task joints. Additionally, Since the base (also referred to as the floating base) of the humanoid robot is floating relative to the world coordinate system when the humanoid robot walks, the positions q further include the state of the floating base $q^{float}$. In one embodiment, the waist pose of the humanoid robot may be selected as the state of the floating base.

Based on the foregoing mapping relationship, an optimization problem related to the torques required by the dynamic task joints can be constructed. In one embodiment, in order to make the actual acceleration of the control targets in the dynamic tasks as close to the pre-planned desired acceleration as possible, an optimization problem such as the squared difference (least square method) can be used to construct the optimization model. The optimization model f of torques required for the dynamic task joints is as follows:

$$f = \min_{\tau^{dyna}}\left\|J^{dyna}\ddot{q} + \dot{J}^{dyna}\dot{q} - \ddot{x}_d^{dyna}\right\|^2,$$

where $\tau^{dyna}$ represents the torques required for the dynamic task joints.

The above-mentioned least square optimization problem is only an example of an optimization model. Other optimization problems such as minimizing energy can also be used to construct the optimization model, which is not detailed here.

In one embodiment, constraints of the optimization model can be constructed, so as to solve the torques required by the dynamic task joints that meet the corresponding constraints. In one embodiment, the constraints of the optimization model may be set based on the torques of the kinematic task joints and the kinematic task joints.

In one embodiment, the torques of the kinematic task joints and the torques of the dynamic task joints should satisfy the dynamic equation of the humanoid robot after the task decomposition, and satisfy the relationship between the joint torques of the humanoid robot and the external forces (also referred to as contact forces) on all contact points. Typically, the contact forces should also satisfy the constraints in relation to the friction cone. It should be noted that contact points refer to the ends of the humanoid robot in contact with the environment such as the feet of the robot.

In one embodiment, for the foregoing optimization model, the torques of kinematic task joints and the torques of dynamic task joints satisfy the following dynamic equation of humanoid robot after task decomposition: $M\ddot{q}+N_s^Th+\gamma=N_N B^{kine}\tau^{kine}+N_N^T B^{dyna}\tau^{dyna}$. The constraints of the optimization model may include the relationship between the joint torques and the contact forces $F_f$ of the humanoid robot:

$$F_f = (JM^{-1}J^T)^{-1}\left(JM^{-1}h - \dot{J}\dot{q} - JM^{-1}\begin{bmatrix}\tau^{kine}\\\tau^{dyna}\end{bmatrix}\right).$$

The constraints of the optimization model may further include the above-mentioned constraints between the contact forces and the friction cone. It should be noted that the constraints of the optimization model can be set according to actual task requirements.

Step S140: Solve a pre-built optimization model of torques required for the dynamic task joints based on the calculated torques of the kinematic task joints, to obtain torques required by the dynamic task joints for performing the dynamic tasks.

After the torques of the kinematic task joints are calculated, they will be substituted into the dynamic equation after task decomposition and the equation of the constraints such as the relationship between the joint torques and the contact forces. Then, the optimization model of the torques required by the dynamic task joints is solved, so that the actual acceleration of the ends can approach the given desired acceleration as much as possible, even if the values of the optimized model constructed above are the smallest. The torques required by the dynamic task joints obtained at this time will be used to execute the dynamic tasks.

The decoupling control method for the humanoid robot according to embodiments above obtains kinematic tasks and dynamic tasks by decomposing the whole-body tasks of the humanoid robot, and classifies the types of corresponding joints. Different control methods are adopted for different tasks. When the kinematic task control is performed by solving the desired positions and desired speeds of the kinematic task joints, an optimization model with constraints is constructed to solve the torques required by the dynamic task joints to realize the dynamic task control. The method according to the embodiments above can realize the two control modes of kinematic control and dynamic control simultaneously under the same framework. The method according to the embodiments above can select control modes for different control tasks according to task requirements, and does not conflict in control effects, thereby providing a decoupling solution for full-body task control of a humanoid robot.

Referring to FIG. 6, in one embodiment, a decoupling control device 100 for a humanoid robot may include a task decomposition module 110, a kinetic control module 120, a kinetic torque calculation module 130, and a dynamic control module 140.

The task decomposition module 110 is to decompose tasks of the humanoid robot to obtain kinematic tasks and dynamic tasks, and classify corresponding joints of the humanoid robot into kinematic task joints or dynamic task joints.

The kinetic control module 120 is to solve desired positions and desired speeds of the kinematic task joints for performing the kinematic tasks according to desired positions and desired speeds of ends in the kinematic tasks using it verse kinematics.

The kinetic torque calculation module 130 is to calculate torques of the kinematic task joints based on the desired positions and desired speeds of the kinematic task joints. In one embodiment, the kinetic torque calculation module 130 is to calculate torques of the kinematic task joints at a current moment based on a preset control law according to desired positions and desired speeds of the kinematic task joints at the current moment and actual positions and actual speeds of the kinematic task joints at the current moment. The torques are to solve the optimization model. In another embodiment, the kinetic torque calculation module 130 is to calculate torque differences of the kinematic task joints at a previous moment, and correcting the torques of the kinematic task joints at the current moment using the torque differences of the kinematic task joints at the previous moment to obtain corrected torques. The corrected torques are to solve the optimization model.

The dynamic control module 140 is to solve a pre-built optimization model of torques required for the dynamic task joints based on the calculated torques of the kinematic task joints, to obtain torques required by the dynamic task joints for performing the dynamic tasks. The optimization model is constructed according to a mapping relationship between acceleration of ends in the dynamic tasks and acceleration of joints in the dynamic tasks, and constraints of the optimization model are set based on the torques of the kinematic task joints and the dynamic task joints.

It can be understood that the device of the embodiment above corresponds to the method of the foregoing embodiments. For specific working processes of the device, modules and units described above, reference may be made to corresponding processes in the embodiments of the foregoing method, which are not repeated herein.

Another aspect of the present disclosure is directed to a non-transitory computer-readable storage medium storing instructions which, when executed, cause one or more processors to perform the methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage device or the memory module having the computer instructions stored thereon, as disclosed. In some embodiments, the computer-readable storage medium may be a disc or a flash drive having the computer instructions stored thereon.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions nay be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more united may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable storage medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented decoupling control method for a humanoid robot, comprising:
    decomposing tasks of the humanoid robot to obtain kinematic tasks and dynamic tasks, and classifying corresponding joints of the humanoid robot into kinematic task joints or dynamic task joints;
    solving desired positions and desired speeds of the kinematic task joints for performing the kinematic tasks according to desired positions and desired speeds of ends in the kinematic tasks using inverse kinematics, and controlling the kinematic task joints to perform the kinematic tasks according to the desired positions and desired speeds of the kinematic task joints;
    calculating torques of the kinematic task joints based on the desired positions and desired speeds of the kinematic task joints; and
    solving a pre-built optimization model of torques required for the dynamic task joints based on the calculated torques of the kinematic task joints, to obtain torques required by the dynamic task joints for performing the dynamic tasks, and controlling the dynamic task joints to perform the dynamic tasks according to the torques required by the dynamic task joints, wherein the optimization model is constructed according to a mapping relationship between acceleration of ends in the dynamic tasks and acceleration of joints in the dynamic tasks, and constraints of the optimization model are set based on the torques of the kinematic task joints and the dynamic task joints.

2. The method of claim 1, wherein calculating the torques of the kinematic task joints based on the desired positions and desired speeds of the kinematic task joints comprises:
    calculating torques of the kinematic task joints at a current moment based on a preset control law according to desired positions and desired speeds of the kinematic task joints at the current moment and actual positions and actual speeds of the kinematic task joints at the current moment, wherein the torques of the kinematic task joints at the current moment are configured for solving the optimization model.

3. The method of claim 2, further comprising:
    calculating torque differences of the kinematic task joints at a previous moment, and correcting the torques of the kinematic task joints at the current moment using the torque differences of the kinematic task joints at the previous moment to obtain corrected torques, wherein the corrected torques are configured for solving the optimization model.

4. The method of claim 3, wherein calculating the torque differences of the kinematic task joints at the previous moment comprises:
reading torques of the kinematic task joints at the previous moment that are calculated using the preset control law;
calculating back actual torques of the kinematic task joints at the previous moment using a dynamic equation after task decomposition based on actual acceleration of the kinematic task joints at the previous moment; and
obtaining the torque differences of the kinematic task joints at the previous moment by performing subtraction between the calculated torques of the kinematic task joints at the previous moment and the actual torques of the kinematic task joints at the previous moment.

5. The method of claim 1, wherein the mapping relationship between the acceleration of the ends in the dynamic tasks and the acceleration of the joints in the dynamic tasks is as follows: $\ddot{x}^{dyna}=J^{dyna}\ddot{q}+\dot{J}^{dyna}\dot{q}$, where $\ddot{x}^{dyna}$ represents the acceleration of the ends in the dynamic tasks, $J^{dyna}$ represents a Jacobian matrix for control ends in the dynamic tasks, $\dot{J}^{dyna}$ represents a derivative of the Jacobian matrix $J^{dyna}$, $\dot{q}$ and $\ddot{q}$ represent speeds and acceleration of all of joints of the humanoid robot; the optimization model of torques required for the dynamic task joints is as follows:

$$f = \min_{\tau^{dyna}} \left\| J^{dyna}\ddot{q} + \dot{J}^{dyna}\dot{q} - \ddot{x}_d^{dyna} \right\|^2,$$

where $\tau^{dyna}$ represents the torques required for the dynamic task joints.

6. The method of claim 1, wherein setting of the constraints of the optimization model based on the torques of the kinematic task joints and the dynamic task joints, comprises:
constructing a dynamic equation for the humanoid robot after task decomposition, and a relationship between joint torques of the humanoid robot and external forces on all contact points, based on the torques of the kinematic task joints and the torques of the dynamic task joints, wherein the dynamic equation for the humanoid robot after task decomposition is as follows: $M\ddot{q}+N_s^T h+\gamma=N_s^T B^{kine}\tau^{kine}+N_s^T B^{dyna}+\tau^{dyna}$, where $N_s=I-J^T(JM^{-1}J^T)^{-1}JM^{-1}$, $\gamma=-J^T(JM^{-1}J^T)\dot{J}\dot{q}$, M represents an inertia matrix, h includes gravity, Coriolis force and centrifugal force, $\dot{q}$ and $\ddot{q}$ represent speeds and acceleration of all of joints of the humanoid robot, I represents an identity matrix, $B^{kine}$ and $B^{dyna}$ represent torque selection matrices of the kinematic task joints and the kinematic task joints, $\tau^{kine}$ and $\tau^{dyna}$ represent the torques of the kinematic task joints and the torques of the dynamic task joints, J represents a Jacobian matrix of all contact points of the humanoid robot, and $\dot{J}$ represents a derivative of the Jacobian matrix J;
wherein the relationship between joint torques of the humanoid robot and external forces on all contact points is as follows:

$$F_f = (JM^{-1}J^T)^{-1}\left(JM^{-1}h - \dot{J}\dot{q} - JM^{-1}\begin{bmatrix}\tau^{kine}\\\tau^{dyna}\end{bmatrix}\right),$$

where $F_f$ represents the external forces on all contact points.

7. The method of claim 1, wherein classifying corresponding joints of the humanoid robot into kinematic task joints or dynamic task joints comprises:
classifying arm joints of the humanoid robot as the kinematic task joints, and classifying leg joints of the humanoid robot as the dynamic task joints.

8. A humanoid robot comprising:
a plurality of joints;
one or more processors electrically coupled to the joints; and
a memory coupled to the one or more processors, the memory storing programs that, when executed, cause the one or more processors to:
decompose tasks of the humanoid robot to obtain kinematic tasks and dynamic tasks, and classify the joints of the humanoid robot into kinematic task joints or dynamic task joints;
solve desired positions and desired speeds of the kinematic task joints for performing the kinematic tasks according to desired positions and desired speeds of ends in the kinematic tasks using inverse kinematics, and control the kinematic task joints to perform the kinematic tasks according to the desired positions and desired speeds of the kinematic task joints;
calculate torques of the kinematic task joints based on the desired positions and desired speeds of the kinematic task joints; and
solve a pre-built optimization model of torques required for the dynamic task joints based on the calculated torques of the kinematic task joints, to obtain torques required by the dynamic task joints for performing the dynamic tasks, and control the dynamic task joints to perform the dynamic tasks according to the torques required by the dynamic task joints, wherein the optimization model is constructed according to a mapping relationship between acceleration of ends in the dynamic tasks and acceleration of joints in the dynamic tasks, and constraints of the optimization model are set based on the torques of the kinematic task joints and the dynamic task joints.

9. The humanoid robot of claim 8, wherein, to calculate the torques of the kinematic task joints based on the desired positions and desired speeds of the kinematic task joints, the programs, when executed, further cause the one or more processors to:
calculate torques of the kinematic task joints at a current moment based on a preset control law according to desired positions and desired speeds of the kinematic task joints at the current moment and actual positions and actual speeds of the kinematic task joints at the current moment, wherein the torques of the kinematic task joints at the current moment are configured for solving the optimization model.

10. The humanoid robot of claim 9, wherein the programs that, when executed, further cause the one or more processors to:
calculate torque differences of the kinematic task joints at a previous moment, and correct the torques of the kinematic task joints at the current moment using the torque differences of the kinematic task joints at the previous moment to obtain corrected torques, wherein the corrected torques are configured for solving the optimization model.

11. The humanoid robot of claim 10, wherein, to calculate the torque differences of the kinematic task joints at the previous moment, the programs, when executed, further cause the one or more processors to:

read torques of the kinematic task joints at the previous moment that are calculated using the preset control law;
calculate back actual torques of the kinematic task joints at the previous moment using a dynamic equation after task decomposition based on actual acceleration of the kinematic task joints at the previous moment; and
obtain the torque differences of the kinematic task joints at the previous moment by performing subtraction between the calculated torques of the kinematic task joints at the previous moment and the actual torques of the kinematic task joints at the previous moment.

12. The humanoid robot of claim 8, wherein the mapping relationship between the acceleration of the ends in the dynamic tasks and the acceleration of the joints in the dynamic task is as follows: $\ddot{x}^{dyna}=J^{dyna}\ddot{q}+\dot{J}^{dyna}\dot{q}$, where $\ddot{x}^{dyna}$ represents the acceleration of the ends in the dynamic tasks, $J^{dyna}$ represents a Jacobian matrix for control ends in the dynamic tasks, $\dot{J}^{dyna}$ represents a derivative of the Jacobian matrix $J^{dyna}$, $\dot{q}$ and $\ddot{q}$ represent speeds and acceleration of all of joints of the humanoid robot; the optimization model of torques required for the dynamic task joints is as follows:

$$f = \min_{\tau^{dyna}}\left\|J^{dyna}\ddot{q}+\dot{J}^{dyna}\dot{q}-\ddot{x}_d^{dyna}\right\|^2,$$

where $\tau^{dyna}$ represents the torques required for the dynamic task joints.

13. The humanoid robot of claim 8, wherein, to set the constraints of the optimization model based on the torques of the kinematic task joints and the dynamic task joints, the programs, when executed, further cause the one or more processors to:
construct a dynamic equation for the humanoid robot after task decomposition, and a relationship between joint torques of the humanoid robot and external forces on all contact points, based on the torques of the kinematic task joints and the torques of the dynamic task joints, wherein the dynamic equation for the humanoid robot after task decomposition is as follows: $M\ddot{q}+N_s^T h+\gamma=N_s^T B^{kine}\tau^{kine}+N_s^T B^{dyna}\tau^{dyna}$, where $N_s=I-J^T(JM^{-1}J^T)^{-1}JM^{-1}$, $\gamma=-J^T(JM^{-1}J^T)\dot{J}\dot{q}$, M represents an inertia matrix, h includes gravity, Coriolis force and centrifugal force, $\dot{q}$ and $\ddot{q}$ represent speeds and acceleration of all of joints of the humanoid robot, I represents an identity matrix, $B^{kine}$ and $B^{dyna}$ represent torque selection matrices of the kinematic task joints and the kinematic task joints, $\tau^{kine}$ and $\tau^{dyna}$ and T represent the torques of the kinematic task joints and the torques of the dynamic task joints, J represents a Jacobian matrix of all contact points of the humanoid robot, and $\dot{J}$ represents a derivative of the Jacobian matrix J;
wherein the relationship between joint torques of the humanoid robot and external forces on all contact points is as follows:

$$F_f = (JM^{-1}J^T)^{-1}\left(JM^{-1}h - \dot{J}\dot{q} - JM^{-1}\begin{bmatrix}\tau^{kine}\\\tau^{dyna}\end{bmatrix}\right),$$

where $F^f$ represents the external forces on all contact points.

14. The humanoid robot of claim 8, wherein, to classify the joints of the humanoid robot into the kinematic task joints or the dynamic task joints, the programs, when executed, further cause the one or more processors to:
classify arm joints of the humanoid robot as the kinematic task joints, and classify leg joints of the humanoid robot as the dynamic task joints.

15. A non-transitory computer-readable storage medium storing instructions that, when executed by at least one processor, cause the at least one processor to perform a decoupling control method for a humanoid robot, the method comprising:
decomposing tasks of the humanoid robot to obtain kinematic tasks and dynamic tasks, and classifying corresponding joints of the humanoid robot into kinematic task joints or dynamic task joints;
solving desired positions and desired speeds of the kinematic task joints for performing the kinematic tasks according to desired positions and desired speeds of ends in the kinematic tasks using inverse kinematics, and controlling the kinematic task joints to perform the kinematic tasks according to the desired positions and desired speeds of the kinematic task joints;
calculating torques of the kinematic task joints based on the desired positions and desired speeds of the kinematic task joints; and
solving a pre-built optimization model of torques required for the dynamic task joints based on the calculated torques of the kinematic task joints, to obtain torques required by the dynamic task joints for performing the dynamic tasks, and controlling the dynamic task joints to perform the dynamic tasks according to the obtained torques required by the dynamic task joints, wherein the optimization model is constructed according to a mapping relationship between acceleration of ends in the dynamic tasks and acceleration of joints in the dynamic tasks, and constraints of the optimization model are set based on the torques of the kinematic task joints and the dynamic task joints.

16. The non-transitory computer-readable storage medium of claim 15, wherein calculating the torques of the kinematic task joints based on the desired positions and desired speeds of the kinematic task joints comprises:
calculating torques of the kinematic task joints at a current moment based on a preset control law according to desired positions and desired speeds of the kinematic task joints at the current moment and actual positions and actual speeds of the kinematic task joints at the current moment, wherein the torques of the kinematic task joints at the current moment are configured for solving the optimization model.

17. The non-transitory computer-readable storage medium of claim 16, wherein the method further comprises:
calculating torque differences of the kinematic task joints at a previous moment, and correcting the torques of the kinematic task joints at the current moment using the torque differences of the kinematic task joints at the previous moment to obtain corrected torques, wherein the corrected torques are configured for solving the optimization model.

18. The non-transitory computer-readable storage medium of claim 17, wherein calculating the torque differences of the kinematic task joints at the previous moment comprises:
reading torques of the kinematic task joints at the previous moment that are calculated using the preset control law;
calculating back actual torques of the kinematic task joints at the previous moment using a dynamic equation after task decomposition based on actual acceleration of the kinematic task joints at the previous moment; and obtaining the torque differences of the kinematic task joints at the previous moment by performing subtraction between the calculated torques of the kinematic task joints at the previous moment and the actual torques of the kinematic task joints at the previous moment.

19. The non-transitory computer-readable storage medium of claim 15, wherein the mapping relationship between the acceleration of the ends in the dynamic tasks and the acceleration of the joints in the dynamic tasks is as follows: $\ddot{x}^{dyna} = J^{dyna}\ddot{q} + \dot{J}^{dyna}\dot{q}$, where $\ddot{x}^{dyna}$ represents the acceleration of the ends in the dynamic tasks, $J^{dyna}$ represents a Jacobian matrix for control ends in the dynamic tasks, $\dot{J}^{dyna}$ represents a derivative of the Jacobian matrix $J^{dyna}$, $\dot{q}$ and $\ddot{q}$ represent speeds and acceleration of all of joints of the humanoid robot; the optimization model of torques required for the dynamic task joints is as follows:

$$f = \min_{\tau^{dyna}} \left\| J^{dyna}\ddot{q} + \dot{J}^{dyna}\dot{q} - \ddot{x}_d^{dyna} \right\|^2,$$

where $\tau^{dyna}$ represents the torques required for the dynamic task joints.

20. The non-transitory computer-readable storage medium of claim 15, wherein setting of the constraints of the optimization model based on the torques of the kinematic task joints and the dynamic task joints, comprises:
constructing a dynamic equation for the humanoid robot after task decomposition, and a relationship between joint torques of the humanoid robot and external forces on all contact points, based on the torques of the kinematic task joints and the torques of the dynamic task joints, wherein the dynamic equation for the humanoid robot after task decomposition is as follows: $M\ddot{q} + N_s^T h + \gamma = N_s^T B^{kine}\tau^{kine} + N_s^T B^{dyna} + \tau^{dyna}$, where $N_s = I - J^T(JM^{-1}J^T)^{-1}JM^{-1}$, $\gamma = -J^T(JM^{-1}J^T)^{-1}\dot{J}\dot{q}$, M represents an inertia matrix, h includes gravity, Coriolis force and centrifugal force, $\dot{q}$ and $\ddot{q}$ represent speeds and acceleration of all of joints of the humanoid robot, I represents an identity matrix, $B^{kine}$ and $B^{dyna}$ represent torque selection matrices of the kinematic task joints and the kinematic task joints, $\tau^{kine}$ and $\tau^{dyna}$ represent the torques of the kinematic task joints and the torques of the dynamic task joints, J represents a Jacobian matrix of all contact points of the humanoid robot, and $\dot{J}$ represents a derivative of the Jacobian matrix J;

wherein the relationship between joint torques of the humanoid robot and external forces on all contact points is as follows:

$$F_f = (JM^{-1}J^T)^{-1}\left(JM^{-1}h - \dot{J}\dot{q} - JM^{-1}\begin{bmatrix}\tau^{kine}\\\tau^{dyna}\end{bmatrix}\right),$$

where $F_f$ represents the external forces on all contact points.

* * * * *